Patented Feb. 9, 1926.

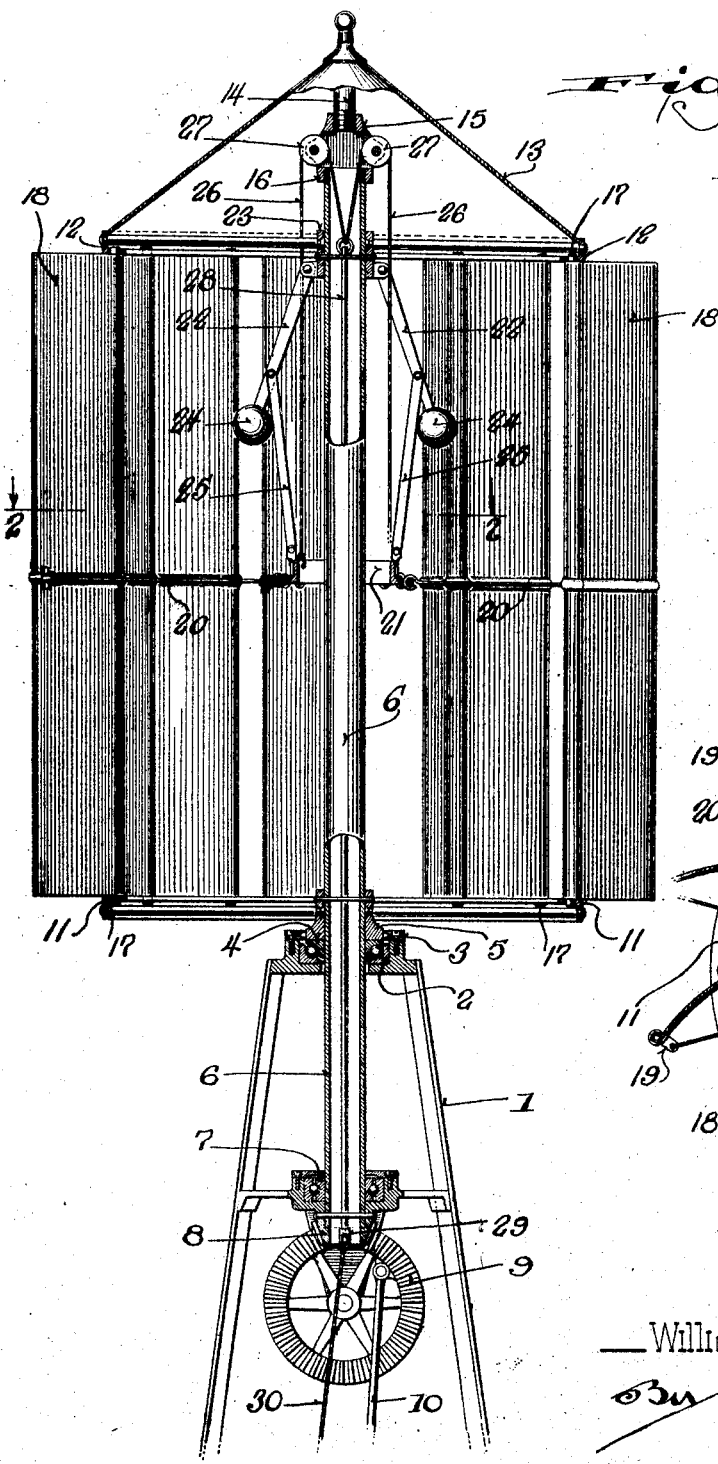

1,572,493

UNITED STATES PATENT OFFICE.

WILLIAM J. KLECKER, OF WATERTOWN, WISCONSIN.

WINDMILL.

Application filed April 21, 1924. Serial No. 707,956.

*To all whom it may concern:*

Be it known that I, WILLIAM J. KLECKER, a citizen of the United States, and resident of Watertown, in the county of Jefferson and State of Wisconsin, have invented certain new and useful Improvements in Windmills; and I do hereby declare that the following is a full, clear, and exact description thereof.

This invention relates to windmills, and is particularly directed to a windmill for pumping, driving an electric generator, or connection to other light loads.

Objects of this invention are to provide a windmill in which the speed of the wind wheel is automatically controlled, so that the device is inherently self-protecting against excessive winds, and in which means are provided whereby the speed of the wind wheel may be manually controlled from adjacent the lower end of the tower in a simple and effective manner.

An embodiment of the invention is shown in the accompanying drawings, in which:—

Figure 1 is a vertical sectional view through the device.

Figure 2 is a horizontal sectional view on the line 2—2 of Figure 1.

The windmill comprises a structural steel tower 1 which carries at its upper end a thrust ball bearing 2, suitable means 3 being provided to keep out the rain and dirt. This ball bearing has its movable raceway 4 in intimate contact with a supporting collar 5 secured to the main tubular vertical shaft 6, as shown in Figure 1. The lower end of the shaft is carried in ball bearings 7 and is held against lateral motion, suitable means being provided to keep out the rain and dirt. The lower end of the shaft 6 may carry a pinion 8 which meshes with a bevel gear 9 provided with a crank and connecting rod 10 or other suitable means of power transmission.

The wind wheel comprises a lower spider 11 and an upper spider 12 preferably having flanged peripheral portions, as shown in Figure 1. The upper spider may carry a protecting conical housing 13, such housing being also supported by means of a threaded tubular member 14 extending downwardly into a fitting 15. This fitting, it will be noted from Figure 1, is provided with an internally threaded lower hub 16 which screws upon the upper end of the main tubular shaft 6.

A plurality of vertical shafts 17 are pivotally carried at regular intervals by the upper and lower spiders 12 and 11, respectively. These shafts are each provided with wings 18 preferably curved, as illustrated in Figure 2, such wings being free to pivot about the axis of their vertical supports. The wings are each provided with lugs 19 which are connected by means of rods 20 with a central ring 21. This ring is spaced out of contact with the tubular main shaft 6 for a purpose to immediately appear.

A plurality of governor arms 22 are pivotally mounted upon suitable lugs carried by a collar 23 secured to the main tubular shaft 6 and are provided with weighted portions 24, as shown in Figure 1. Links 25 connect the ring 21 with the arms 22, as shown in Figure 2.

It will be seen, therefore, that at a predetermined speed of rotation the weights 24 move outwardly and the ring 21 is lifted upwardly, thus throwing the rods 20 inwardly and rocking the wings 18 towards closed position. Thus it is apparent that the windmill is automatically guarded against excessive winds, and the speed is controlled within a predetermined upper limit.

Means are provided for manually controlling the windmill and this means may comprise a pair of chains 26 whose lower ends are attached to ring 21. These chains pass over pulleys 27 carried by the fitting 15, as shown in Figure 1, and pass downwardly into the tubular main shaft 6. At their inner ends they are attached to a longitudinally extending rod 28 whose lower end is connected by means of a swivel 29 with a manually controlled chain 30. The chain 30 extends to the lower portion of the tower and thus permits the manual controlling of the position of the wings 18 from such lower portion of the tower, thereby controlling the operation of the windmill.

It will thus be seen that a windmill has been provided in which the speed is automatically controlled by governor mechanism, and in which additional manual control from the lower portion of the tower is also provided.

It will be seen further that the windmill, although possessing these advantageous features is, nevertheless, of simple and rugged construction, and may be cheaply produced.

Although the invention has been described in considerable detail, it is to be understood that the invention may be variously embodied and is, therefore, to be limited only as claimed.

I claim:

A windmill comprising a tower, a tubular shaft carried thereby and projecting upwardly from the upper end of said tower, a pair of spiders carried by said shaft, a plurality of wings having their inner ends pivotally joined to said spiders, rods extending inwardly from the free ends of said wings, a ring surrounding said shaft and connected to said rods, governor mechanism carried by said shaft said governor mechanism comprising levers pivoted at their upper ends and having weights at their lower ends, links connecting said levers and said ring and adapted to move said ring vertically thereby varying the angular seating of said wings, cables extending upwardly from said ring and downwardly into said tubular shaft, a pair of pulleys carried by the upper end of said tubular shaft and over which said cables pass and manually controlled means extending through said tubular shaft and connected to said cables, said rods being approximately horizontal and said links and levers being approximately vertical when said governor is in its slowest speed position.

In testimony that I claim the foregoing I have hereunto set my hand at Watertown, in the county of Jefferson and State of Wisconsin.

WILLIAM J. KLECKER.